United States Patent [19]

Yamamitsu et al.

[11] Patent Number: 4,597,021
[45] Date of Patent: Jun. 24, 1986

[54] VIDEO RECORDING AND REPRODUCING APPARATUS WITH NOISE REDUCTION

[75] Inventors: Chojuro Yamamitsu, Kawanishi; Ichiro Arimura, Kyoto, both of Japan

[73] Assignee: Matsushita Electric Industrial Co., Ltd., Osaka, Japan

[21] Appl. No.: 693,233

[22] Filed: Jan. 22, 1985

Related U.S. Application Data

[63] Continuation of Ser. No. 123,811, Feb. 22, 1980, abandoned.

[30] Foreign Application Priority Data

Feb. 28, 1979 [JP] Japan ............................ 54-23981

[51] Int. Cl.$^4$ ..................... H04N 5/92; H04N 5/782
[52] U.S. Cl. ........................ 360/33.1; 360/30; 360/25; 358/336; 358/340
[58] Field of Search ............... 360/24, 25, 29, 30, 360/33.1, 65, 36.1, 36.2; 358/127, 167, 336, 340

[56] References Cited

U.S. PATENT DOCUMENTS

| | | | |
|---|---|---|---|
| 3,288,930 | 11/1966 | Johnson | 358/167 |
| 3,333,055 | 7/1967 | Krause | 360/24 |
| 3,571,526 | 3/1971 | Stockwell | 360/24 |
| 3,602,737 | 8/1971 | Radecke | 358/167 |
| 3,715,477 | 2/1973 | Olson et al. | 358/167 |
| 3,893,168 | 7/1975 | Bechly et al. | 360/30 |
| 4,009,334 | 2/1977 | Sypula | 358/167 |
| 4,052,740 | 10/1977 | Coleman, Jr. | 360/30 |
| 4,142,211 | 2/1979 | Faroudja | 358/167 |
| 4,193,084 | 3/1980 | Yamagiwa et al. | 360/30 |
| 4,198,650 | 4/1980 | Hongu et al. | 360/25 |
| 4,200,889 | 4/1980 | Strobele | 360/33 |
| 4,249,202 | 2/1981 | Perry et al. | 358/167 |
| 4,254,436 | 3/1981 | Harford | 358/167 |

OTHER PUBLICATIONS

Graf, Radio Shack Dictionary of Electronics, 1974, pp. 100, 124 and 540.

Primary Examiner—Raymond F. Cardillo
Assistant Examiner—Robert A. Weinhardt
Attorney, Agent, or Firm—Stevens, Davis, Miller & Mosher

[57] ABSTRACT

A video signal recording and reproducing apparatus in which the luminance signal of a color video signal is frequency-modulated for recording and a reproduction frequency-modulated signal is frequency-demodulated to produce a reproduction video signal. A high frequency component is separated from the reproduction video signal and applied to a slice circuit comprising nonlinear elements including, for example, diodes connected in parallel with reverse polarities, thus eliminating noise at the low frequency signals included in the high frequency component. The apparatus further comprises a device for subtracting the sliced signal and the reproduced video signal one from the other in such a manner that the two signals are in phase with each other substantially at the desired ratio and in a predetermined frequency band. In this way, noise contained in the edge portion of the reproduction video signal, crosstalk and moiré patterns caused at the time of azimuth recording without a guardband are decreased, thus improving the signal-to-noise ratio of the edge portion. If this apparatus is combined with a conventional device for reducing noise at the low frequency portion of the video signal, FM interleaving techniques and nonlinear emphasis, a high-density recording with narrow tracks and short wavelength is made possible, thereby producing a stable reproduced image with high S/N ratio having no undesired components.

4 Claims, 22 Drawing Figures

VIDEO RECORDING AND REPRODUCING APPARATUS WITH NOISE REDUCTION

This application is a continuation of application Ser. No. 123,811, filed Feb. 22, 1980 now abandoned.

The present invention relates to a video tape recorder or, more particularly to a method for improving the signal-to-noise ratio of the envelope of a video signal and reducing noise and crosstalk.

Generally, in a simple video tape recorder, a video signal is recorded on a recording medium such as a magnetic tape by frequency modulation (FM) and the reproduction FM signal is demodulated to obtain a reproduction video signal. In order to compensate for a poor signal-to-noise ratio, such a tape recorder uses a noise-reducing circuit. The prior art noise-reducing circuit cannot reduce the noise at the edge i.e. transition portions of the video signal. Only the noise at the flat parts where steep signal transitions do not occur is reduced. This shortcoming is more pronounced in the case where arrow track recording or short wavelength recording is used to attain compactness of the body or tape, resulting in a degraded edge portion which reduces picture quality.

Theoretically, the reduction in signal-to-noise ratio caused by the short wavelength or narrow tracks may be eliminated by increasing the emphasis at the time of recording. In order to effect recording and reproduction successfully in a limited transmission band for a VTR, however, the overshoot of the video signal, commonly referred to as the "hair" of the emphasized video signal is required to be clipped considerably. This alters the rise and fall of the reproduction video signal to such a degree that the waveform cannot be reproduced and are the problem of over modulation (occurrence of black dots at the edge portions) occurs. A promising method for obviating this problem is by using nonlinear emphasis in which the amount of emphasis is reduced for a large input signal and increased for a small input signal. Even in this method, in view of the fact that the envelope representing the high energy of a high frequency component is smaller in emphasis than the flat portion, comprised of low frequency components, the signal-to-noise ratio of the transition portion is lower than that of the flat portion. This problem is more serious for recordng with short wavelength signals and narrow tracks.

Figure 1:
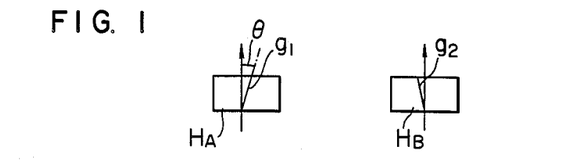
FIG. 1 is a diagram showing conventional azimuth heads.
Figure 2:
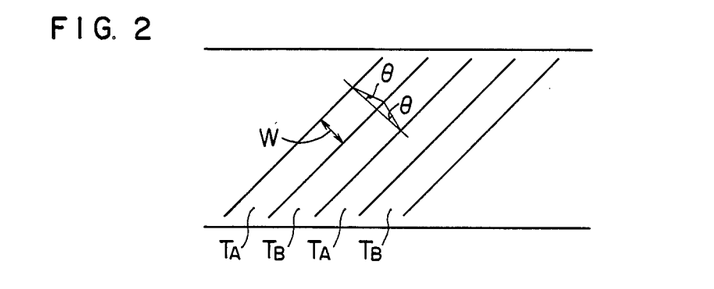
FIG. 2 shows an azimuth recording pattern without any guardband.

In the case of recording and reproduction utilizing what is called azimuth loss in which the angles of gaps $g_1$ and $g_2$ of heads $H_A$ and $H_B$ are different as shown in FIG. 1 and the signal is recorded in tracks $T_A$ and $T_B$ alternately by the heads $H_A$ and $H_B$ respectively without any guardband as shown in FIG. 2, the ratio between the signal S and the crosstalk C from adjacent tracks is expressed by the equation below.

$$C/S \simeq 20 \log \frac{\sin\left(\frac{2\pi \Delta W}{\lambda} \tan\theta\right)}{\frac{2\pi \Delta W}{\lambda} \tan\theta} \cdot \frac{\Delta W}{W - \Delta W}$$

where
$\theta$: Azimuth angle with respect to normal
$\lambda$: Recording wavelength
$W$: Track width
$\Delta W$: Track displacement The values of $\theta$, $\lambda$ and W are generally determined to attain the ratio C/S of $-20$ dB to $-30$ dB. If the track width W is decreased for high-density recording, for instance, the ratio C/S is substantially deteriorated in proportion to the track width, so that crosstalk appears on the television scrren as a beat component. This beat component mainly takes the form of crosstalk of, say, from 0 to 1 MHz in the demodulated luminance signal for the frequency modulation range of 1 MHz (3.4 to 4.4 MHz). Further, a corsstalk component of 0 to 3 Hz appears at the edge portion. In a conventional method disclosed in Japanese Patent Publication No. 29111/76 or 29112/76 for obviating this shortcoming, carrier frequencies of the FM modulated wave are differentiated by $[(2y+1)/2] \cdot f_H$ ($f_H$: horizontal scanning frequency) between adjacent tracks in order to attain a visual reduction of the crosstalk. In theory, this method is effective in the case where there is a line correlation $f(t) = F(t - T_H)$ where $T_H$ is one horizontal period of the video signal. In the case of an ordinary video signal, crosstalk of the edge portion, i.e. transition portion with a steep vertical slope, whose line correlation is easily lost are difficult to eliminate, although the crosstalk at the flat portions, i.e. low frequency portions of the video signal may be visually reduced to a considerable extent. As mentioned above, this prior art method still has the disadvantage that the effect of crosstalk at the edge portion of the video signal cannot be eliminated.

Accordingly, the first object of the present invention is to provide a video signal recording and reproducing apparatus for recording a luminance signal of the video signal by, say, FM modulation, wherein the noise at the edge portion (a comparatively greater portion of intermediate and high frequency components) of the luminance signal FM demodulated for reproduction are reduced, thus improving the signal-to-noise ratio.

The second object of the present invention is to provide a video signal recording and reproducing apparatus in which crosstalk from adjacent tracks is eliminated at the time of reproducing the signal recorded by what is called an azimuth non-guardband recording system with azimuth heads for recording the signal with gaps of different azimuth angles without any guardband between adjacent tracks.

The third object of the present invention is to provide a video signal recording and reproducing apparatus which improves the quality and S/N of the whole picture on the one hand and makes possible high density recording with a signal of short wavelength or narrow tracks on the other hand by combining the method according to the present invention for reducing the noise at the edge portion (comparatively large energy of the intermediate and high frequencies) for an improved signal-to-noise ratio, with the nonlinear process in which emphasis of the intermediate and high frequency is increased for a small signal and comparatively decreased for a large signal, with the FM interleave process in which the recording FM carrier frequency is differentiated by $[(2y+1)/2]f_H$ between adjacent tracks, or with a noise cancellation circuit or noise suppression circuit for reducing the noise accompanying low frequency portions at the time of reproduction.

The above and other objects, features and advantages will be made apparent by the detailed description taken in conjunction with the accompanying drawings, in which.

Figure 3:
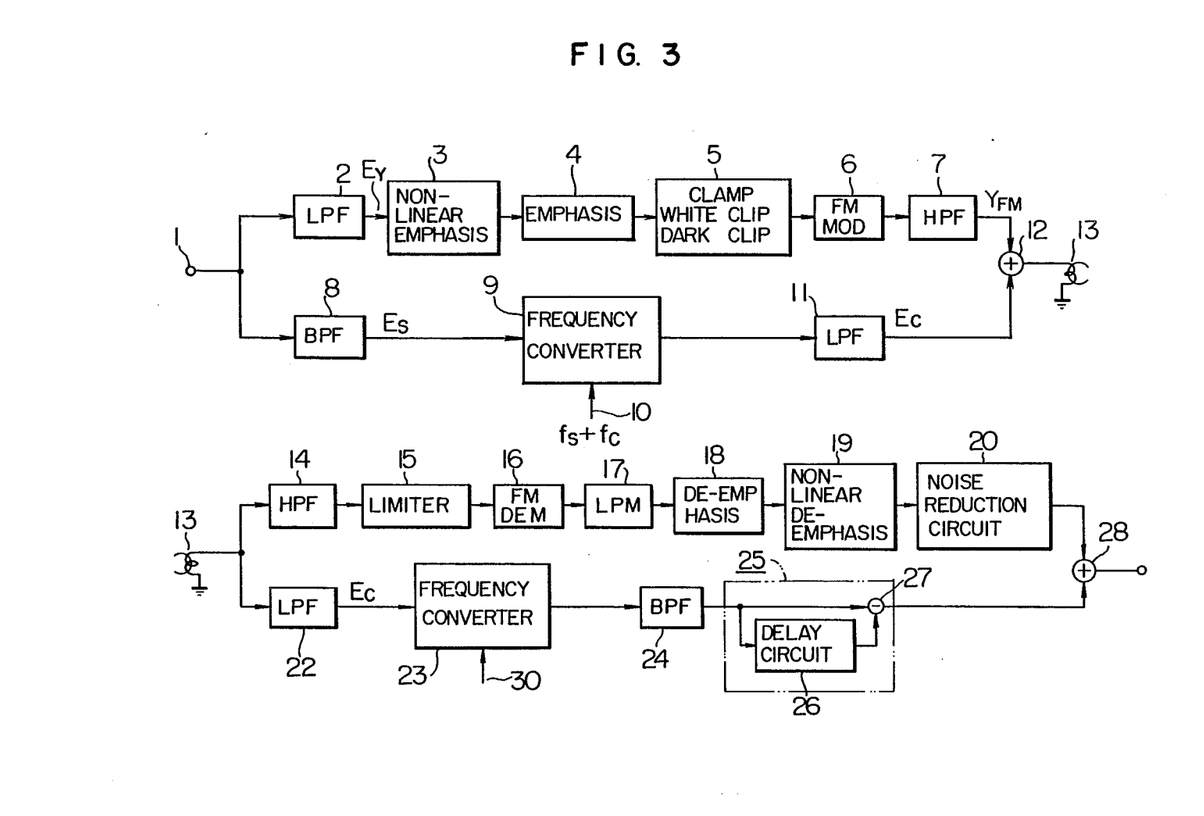
FIG. 3 is a block diagram showing a recording and reproducing system of an azimuth non-guardband video tape recorder.
Figure 4A:
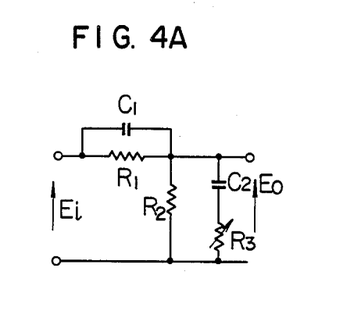
FIG. 4A shows an example of a nonlinear emphasis circuit.
Figure 4B:
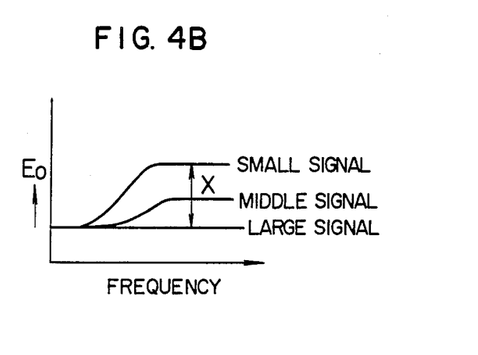
FIG. 4B is a graph showing an example of the characteristics thereof.
Figure 5A:
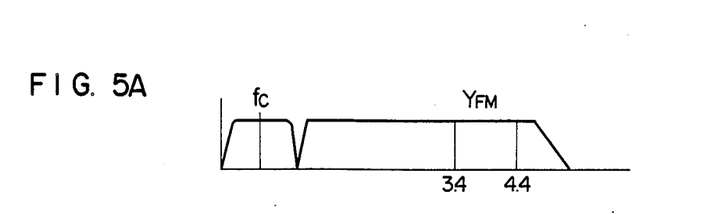
FIGS. 5A, 5B and 5C are diagrams for explaining the recording spectrum for FIG. 3.
Figure 5B:
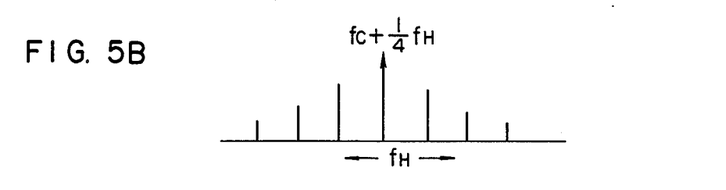
Figure 5C:
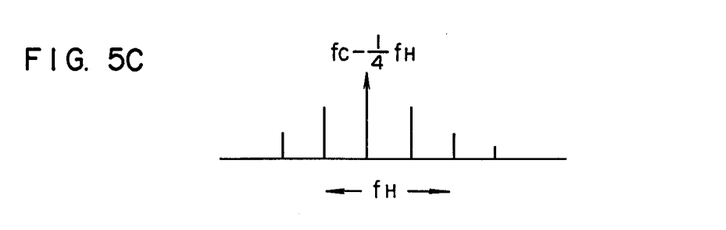

In FIG. 3, a color television signal is applied through a color video signal input terminal 1 to a low-pass filter 2 where a luminance signal $E_Y$ up to 3 MHz is separated. A nonlinear emphasis circuit 3 is for providing an instantaneous nonlinear emphasis characteristic whereby the frequency characteristics remain flat for a large signal input while the intermediate and high frequency components are emphasized for a small signal. The nonlinear emphasis circuit 3 is comprised, for instance, as shown in FIG. 4A. A variable resistor $R_3$ comprises a diode limiter. If constants are determined in such a manner that the relationship $R_1 \cdot C_1 = C_2 \cdot R_2$ is obtained, the variable resistor $R_3$ of the diode limiter conducts and $R_3$ becomes zero for a large input Ei, thus attaining a flat amplitude characteristic as shown in FIG. 4B. When the input Ei is small, by contrast, $R_3$ is infinite and therefore the emphasis is provided by $C_1$, $R_1$ and $R_2$. In response to a middle input signal Ei, the resistor $R_3$ takes a predetermined value. Such frequency characteristics are shown in FIG. 4B. As seen, the maximum emphasis X is 7 dB. In other words, this nonlinear emphasis circuit is such that the signal of the edge portion varying from pedestal to white level of the signal $E_Y$ is not emphasized while the edge portion having a level slightly higher than the pedestal and the flat portions are greatly emphasized. The output of this nonlinear emphasis circuit 3 is applied to a fixed emphasis circuit 4 comprising, say a capacitor $C_1$, resistors $R_1$ and $R_2$ shown in FIG. 4A, in which the intermediate and high frequency components of, say, 13 to 14 dB are emphasized. The output of the fixed emphasis circuit 4 is applied to a clamp/white clip/dark clip circuit 5 where an FM frequency (Sync. tip frequency) corresponding to the sync. signal position is set so that the tip of the overshoot of the luminance signal emphasized is clipped into a range recordable by a VTR. The resulting signal is FM modulated at an FM modulator 6, thereby eliminating the unrequired spectrum. For instance, such a signal is applied through a 1-MHz high-pass filter 7 to a mixer 12 where it is added to low frequency-converted carrier chrominance signal Ec and recorded in a magnetic recording medium by a video heat 13. In the FM modulator 6, the frequency deviation is set at the width of 1 MHz of, say, 3.4 to 4.4 MHz, the white clip frequency is set at, say, 5.3 MHz, and the dark clip frequency is set at, say, 2.9 MHz. In the case of azimuth recording without any guardband between the tracks $T_A$ and $T_B$ as shown in FIG. 2, reproduction of one track is overlapped somewhat on adjacent tracks, thus causing crosstalk. In order to overcome this problem, it is common practice to set the azimuth loss at $-20$ to $-30$ dB while arranging horizontal sync. signals side by side in adjacent tracks $T_A$ and $T_B$. Thus, the difference between the FM carrier wave frequencies of both tracks is negligible because the demodulated unnecessary component is substantially zero in beat because of the correlation of the signals. For instance, the track width W involved is 58 μm and the azimuth angle θ is 6 degrees. When the tape speed is decreased and the track width W narrowed, the azimuth loss is reduced as mentioned above. As a result, even though the horizontal sync signals are in juxtaposition between tracks, crosstalk is produced at a portion of the signal in which the signal correlation is lost, while in a format with horizontal sync signals not in juxtaposition, crosstalk is aggravated. In such a case, the carrier frequency of the FM modulator 6 is differentiated by $[(2y-1)/2]f_H$ between tracks by the FM interleave technique, thus reducing the demodulated beat component visually, although this effect is limited to the signal region having a line correlation. The input color television signal is also applied to a band-pass filter 8 where a carrier chrominance signal of subcarrier frequency $f_S=3.58$ MHz and band width 1 of 0.5 MHz is separated. This carrier chrominance signal is frequency-converted at a frequency converter 9 by a continuous wave 10 of frequency $f_S=f_C$. A carrier chrominance signal Ec converted into a low subcarrier frequency $f_C$ is separated at a low-pass filter 11 and added to the luminance FM signal at a mixer 12. The resulting signal is recorded in the magnetic recording medium in a spectrum as shown in FIG. 5A. In the case of the azimuth non-guardband recording as shown n FIG. 2, the subcarrier frequency $f_c$ of the low-frequency converted carrier chrominance signal for recording is generally selected at several hundred KHz, and therefore the resulting long wavelength for recording reduces the azimuth loss. Thus the phase of the carrier of the continuous wave 10 for track $T_A$ is advanced by 90 degrees for each line (one horizontal period). As a result, as shown in FIG. 5B, the spectrum of the low frequency converted carrier chrominance signal has intervals of $f_H$ on both sides of $f_C+\frac{1}{4}f_H$. On the other hand, the phase is retarded by 90 degrees for each line for track $T_B$, so that the spectrum of the low frequency-converted carrier chrominance signal has intervals of $f_H$ on both sides of $f_C-\frac{1}{4}f_H$ as shown in FIG. 5C. In this way, the chrominance signal is frequency-interleaved between tracks $T_A$ and $T_B$ thereby making it possible to eliminate crosstalk between adjacent tracks by a comb filter which otherwise might occur at the time of reproduction.

For the purpose of reproduction, the reproduction signal from the video head B is separated into a luminance FM signal and a low frequency-converted carrier chrominance signal by a high-pass filter 14 and a low-pass filter 22 respectively. The amplitude variation of the separated luminance FM signal is removed by a limiter circuit 15, and the resulting signal is demodulated into a reproduction luminance signal by an FM demodulator 16 and a low-pass filter 17. The intermediate and high frequency characteristics of this signal are dampened by a de-emphasis circuit 18 having a function the inverse of that of the emphasis circuit 4 for recording, thus reducing the demodulation noise for reproduction. The output of the de-emphasis circuit 18 is inverted or inversely converted by a nonlinear de-emphasis circuit 19 in such a manner that the intermediate and high frequency is dampened in response to a small signal input while flat characteristics are maintained in response to a large signal input. Noise in the resulting signal is further reduced by a noise suppression or noise cancellation circuit 20 and added to the reproduction carrier chrominance signal mentioned later at a mixer 28, thus producing a color video signal at an output terminal 29. The low frequency-converted carrier chrominance signal separated as above, on the other hand, is frequency converted at a frequency converter 23 by the continuous wave 30 of frequency $f_C+f_S$, and is produced in the form of the original carrier chrominance signal through a band-pass filter 24. Crosstalk between adjacent tracks which occurs in this signal is removed by a C-type comb filter 25 including a subtractor 27 for subtracting the output of a one horizontal period delay circuit 26 and a signal not so delayed one from the other, thereby producing a reproduction carrier chrominance signal. Further, at the time of reproduction, the low frequency-converted carrier chrominance signal $E_C$ changes with time. This change is compensated for by a frequency converter 23 through APC or AFC in which the continuous wave 30 of frequency $f_C+f_S$ is also simultaneously subjected to the same change with time.

The block diagram of FIG. 3 is that of a simple VTR known in the trade as VHS (trademark). Now, assume that the tape speed is reduced to ⅓ with a track width of 19 μm or the recording of an even higher density with a shorter wavelength and narrower track. With the decrease in track width, the signal-to-noise ratio is reduced in proportion to the root thereof. At the same time, the azimuth loss is reduced and the crosstalk from adjacent tracks increases. In order to solve this problem, the amount of emphasis X of the nonlinear emphasis circuit 3 may be increased so that the demodulation noise for reproduction is reduced more for a smaller signal, thus securing a similar signal-to-noise ratio. In this way, a proper S/N is secured and small crosstalk is dampened as far as a small-amplitude signal at the flat portion and edge portion is concerned. Nevertheless, the signal-to-noise ratio is not improved for a large signal, i.e., the large-amplitude portion of the edge portion since the frequency characteristics are flat. Nor is crosstalk dampened. Therefore, the picture quality becomes noisier and more unsightly with the increase in amplitude of the edge component signal. Although the crosstalk from adjacent tracks can be reduced visually for the parts having line correlation, the edge portion where the line correlation is easily lost becomes more unsightly with the increase in crosstalk even when the FM interleave is used. Also, in the noise suppression or noise cancellation circuit 20, the low and high frequency components with small amplitude can be reduced in noise, but the noise in the low and high frequency portions of a large amplitude cannot be reduced, so that the edge portion represented by high frequency components becomes very unsightly as compared with the low frequency portions due to noise and crosstalk.

As described above, even though a method for recording with short wavelength and narrow track has been developed in which the signal-to-noise ratio and crosstalk are reduced for the flat portions or edge portions of small amplitude, a method or system by which the signal-to-noise ratio is improved and crosstalk is reduced for the edge portion of large amplitude (such as rise and fall of the luminance signal) has not yet been developed.

In view of this fact, the present invention obviates the above-mentioned shortcomings and provides a method for signal processing by which the noise and crosstalk of the edge portion are reduced and thus the signal-to-noise ratio is improved.

The present invention will be described in detail below with reference to the drawings. A basic block diagram of the present invention is shown in FIG. 6 and a diagram for explaining the operation thereof is shown in FIG. 7.

Figure 7:
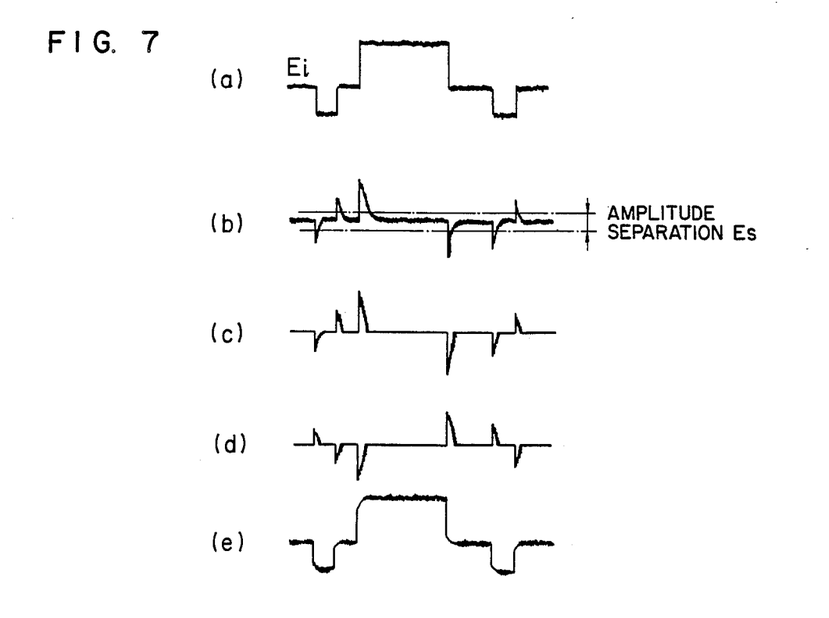
FIGS. 7(a) to 7(e) are diagrams for explaining waveforms produced in the circuit of FIG. 6.

A reproduction video signal having noise and crosstalk components as shown in FIG. 7 (a) is applied to a reproduction video signal input terminal 31. The signal from the reproduction video signal input terminal 31 is applied to a high-pass filter 32 where intermediate and high frequency components forming the edge component of the video signal as shown in FIG. 7(b) are extracted. The corner frequency (−3 db frequency) of the high-pass filter 32 is about 0.5 to 1.5 MHz depending on the noise or crosstalk involved. The intermediate and high frequency components thus obtained are applied to amplitude separation circuit 33 which removes from an input signal thereto signal components lying within a band $E_S$ defined by first and second threshold levels through the use of a non-linear element, thus producing a signal having amplitude components which exceed the band $E_S$, that is, the first and second threshold levels and which contains cross-talk and noise of only the edge portion and the intermediate and high frequency components of the edge component as shown in FIG. 7(c). The phase of this signal (c) is inverted by an inverting amplifier 34, thus producing a signal of FIG. 7(d). These signals of FIGS. 7(d) and 7(a) are added to each other at an appropriate ratio, e.g. −25 to −40 db, by a mixer 35, thus producing a signal of FIG. 7(e) at the reproduction video signal output terminal 36, which signal has the same amount of noise as the signal of FIG. 7(a) in the flat portion and has no noise or crosstalk in the edge portion.

Figure 6:
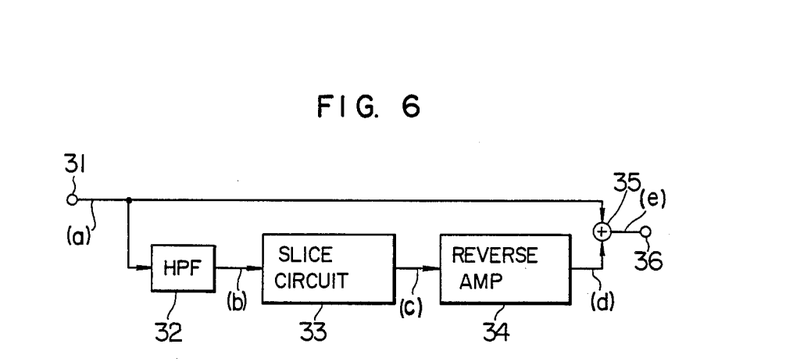
FIG. 6 is a basic block diagram showing a noise-reducing circuit of a video signal recording and reproducing apparatus according to the present invention.

As seen from FIG. 6 or 7, those components of low frequency and the edge portion (rise and fall regions of the luminance signal and intermediate and high frequency components) which are within the band $E_S$ are ignored, so that only those signal components which have exceeded the first and second threshold levels defining band $E_S$ noise and crosstalk are picked up. The original signal is subtracted proportionately to a predetermined amount corrresponding to such components picked up, thus eliminating the noise and crosstalk. At the same time, the signal components associated with the edge component are slightly eliminated, thus somewhat reducing the rise and fall time. This portion, however, is very small as compared with the whole signal due to small noise or crosstalk, and therefore the signal is not deteriorated so seriously, thus posing no problem for the simple-type VTR at all. Reference characters (a), (b), (c), (d) and (e) in FIG. 6 correspond to (a) to (e) in FIG. 7 respectively.

Figure 8:
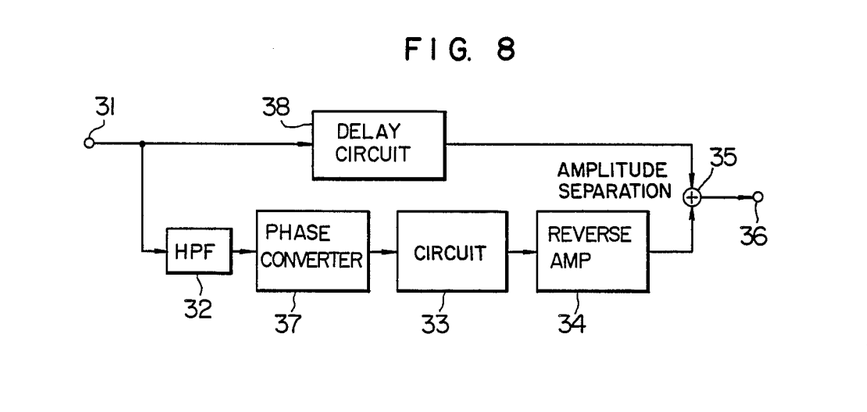
FIG. 8 is a block diagram showing another embodiment of the present invention.

The block diagram of FIG. 8 shows a circuit for further improving the meritorious effect of the present invention. Reference numerals in the drawing similar to those in FIG. 6 denote like component parts as in FIG. 6. In FIG. 8, a phase corrector 37 is provided in a high frequency-processing system for phase correction of high pass filter 32 which is required in view of the fact that the group delay characteristics of the high-pass filter 32 change and the phase advances with the increase in frequency. Further, a delay circuit 38 providing the same time delay as that produced between the high pass filter 32 and the inverting amplifier 34 is inserted in the original reproduction video signal system so that the two signals added in the mixer 35 coincide with each other in timing, thus placing the two signals in phase in a predetermined frequency range such as from 0.5 to 3 MHz. As a result, noise and crosstalk between adjacent tracks are dampened over a wide range.

In FIG. 6 or 8, if the inverting amplifier 34 is absent, the mixer 35 may of course be able to have the same effect by using a subtractor. Instead, a circuit for correcting the frequency characteristics may be inserted at an appropriate point.

Figure 9:
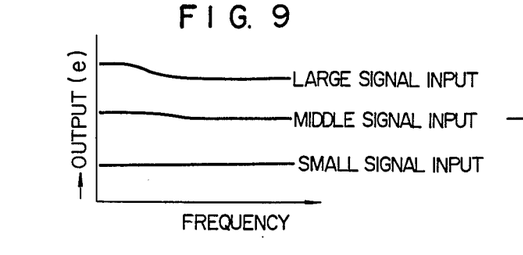
FIG. 9 is a graph showing the frequency characteristics of the apparatus according to the present invention.
Figure 10:
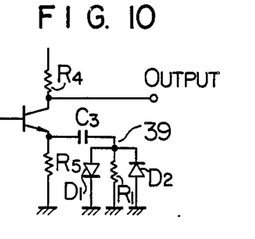
FIG. 10 is a diagram showing an example of an edge portion component emphasis circuit for a large signal.

The frequency characteristics of the circuits of FIGS. 6 and 8 will be explained below. When the input signal is small and the output of the high-pass filter 32 is within the band $E_S$, no output is produced at (c), but the same input signal is produced at the output (e) of this circuit, thus providing a flat frequency characteristic as shown in FIG. 9 with reference to the application of a small signal. When the input signal is large, by contrast, the amplitude separation circuit 33 fully conducts, so that the characteristics of the high-pass filter 32 and the input signal characteristics are subtracted by a predetermined value. As a result, the intermediate and high frequency ranges are dampened, thus leading to the de-emphasis characteristics as shown in FIG. 9 in connection with the application of a large signal. In similar fashion, with application of a middle level signal input, the amount of de-emphasis is reduced below that of a large signal. If it is unacceptable that the rise and fall of the edge component of large amplitude somewhat reduces, it is desirable to insert a circuit as shown in FIG. 10 in the main signal route of FIG. 6 or 8. Specifically, the emitter resistor $R_5$ and the collector resistor $R_4$ of a transistor make up an amplifier. A capacitor $C_3$ and a resistor $R_6$ high in value as compared with the resistor $R_5$ are used for differentiation. Diodes $D_1$ ad $D_2$ are connected to both sides of the resistors $R_6$ thus making up a limiter. With the application of a large signal to the input terminal, diodes $D_1$ and $D_2$ conduct so that the intermediate and high frequency characteristics are emphasized by the impedance due to the resistor $R_5$, capacitor $C_3$ and the conduction resistances of the diodes $D_1$ and $D_2$. As a result, a signal without any reduction in waveform is produced from the circuits shown in the block diagrams of FIGS. 6 and 8 showing the basic configurations of the present invention.

The reproduction video input terminal 31, on the other hand, is impressed with a signal not deemphasized which is an output of the low-pass filter 17. This signal is the one emphasized at the time of recording, and therefore the high-pass filter 32 may be comparatively simply constructed, thus facilitating phase correction.

As explained above, according to the present invention, the intermediate and high frequency components corresponding to the edge component are separated, and a signal having portions thereof within the band $E_S$ removed is added to the reproduction video signal at opposite polarities, with the result that the noise and crosstalk contained in the edge portion are removed by a very simple construction on the one hand and the signal-to-noise ratio at the rise and fall portions is improved on the other hand. Further, by adding the intermediate and high frequency components and the noise to each other at opposite polarities as shown in FIG. 7(e), the frequency characteristics are deteriorated to some degree but this causes no problem for the simple-type recorder at all. If it causes a problem, such a problem is easily solved by a configuration such as shown in FIG. 10.

In order to further improve the performance of signal reproduction, a circuit is provided for emphasizing the intermediate and high frequency range in advance at the time of recording. In this way, the reproduction frequency characteristics are restored thus eliminating the noise and crosstalk from the edge portion.

Figure 11:
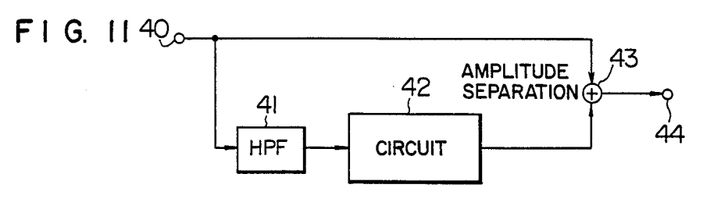
FIG. 11 is a block diagram showing the essential parts of a recording system which makes the apparatus according to the invention more effective.

The diagram of FIG. 11 shows an example of such a method. In this diagram, a video signal input terminal 40 is impressed with a video output signal from the emphasis circuit 4 in FIG. 3. The intermediate and high frequency component of this video signal is produced from the high-pass filter 41, and added to the input video signal at a mixer 43 through an amplitude seperation circuit 42 including a nonlinear element, thus producing a signal at the output terminal 44. This signal is recorded after being frequency-modulated by the frequency modulator 6. Without the edge component emphasis circuit as shown in FIG. 11, it is of course possible to design an ordinary emphasis circuit 4 in such a manner as to provide the emphasis characteristics thereof including the characteristics of such an additional emphasis circuit.

The operation of the circuit of FIG. 11 will be explained below. In the case where the output of the high-pass filter 41 is lower than the band Es, the output 44 is proportional to the level Ei of the input video signal, while the sum of the input video signal level Ei and the $\gamma$ characteristic of the nonlinear element is produced at the output terminal when the output of the high-pass filter 41 is higher than the band Es. In other words, this configuration is such that the intermediate and high frequency components are emphasized. In this way, the reverse converters of FIGS. 6 and 8 restore the original frequency characteristics, thus eliminating the noise and crosstalk at the edge portion.

The circuit of FIG. 11 is similar to the noise suppression circuit of a noise reduction circuit used with a conventional reproduction system but is different in that the circuit of FIG. 11 has no low-pass filter having the same corner frequency ($-3$ db frequency) as the high-pass filter 41 in the mixer 43 and the video signal input terminal 40. For this reason, the intermediate and high frequency characteristics of a large signal can be emphasized.

The output of the low-pass filter 17 of FIG. 3 is not necessarily used as an input signal in FIGS. 6 and 8. Alternatively, in the case where the signal from the de-emphasis circuit 18 or the nonlinear de-emphasis circuit 19 is used as an input signal, the output of the nonlinear emphasis circuit 3 or the low-pass filter 2 may be used as an input signal in FIG. 11.

In the case of FIG. 6 or 8 according to the present invention, the signal-to-noise ratio of the flat portion of the video signal is not improved and therefore a conventional noise reduction circuit 20 is employed usually in a stage after the circuit according to the present invention. A simple configuration integrating such a function while maintaining the same performance is shown in FIG. 12, and waveforms produced in such a circuit are shown in FIG. 13.

Figure 12:
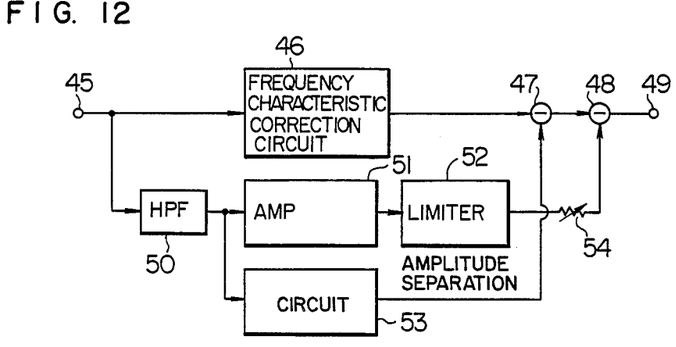
FIG. 12 is a diagram showing still another embodiment of the present invention.
Figure 13:
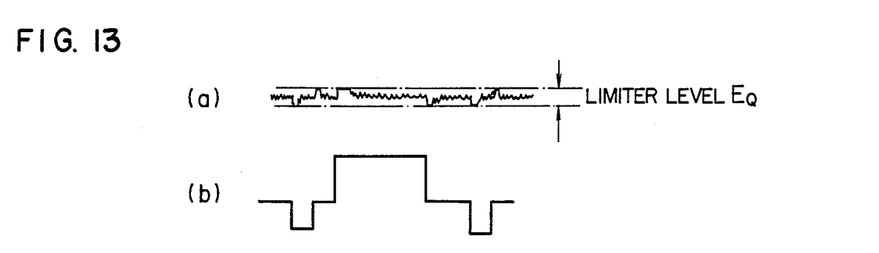
FIG. 13, consisting of (a) and (b), is a diagram for explaining waveforms produced in the circuit of FIG. 12.

With reference to FIG. 12, the input terminal 45 is impressed with a reproduction video signal, i.e., the output of the nonlinear de-emphasis circuit 19 of FIG. 3, the waveform of which is shown in FIG. 7(a). This signal is applied to a frequency characteristics-correcting circuit 46 and a high-pass filter 50. The frequency characteristics-correcting circuit 46 is for correcting the frequency characteristics which are deteriorated by the function of noise reduction at the flat portion. The high-pass filter 50 produces an intermediate and high frequency component of the edge portion (FIG. 7(b)), which is amplified by an amplifier 51. The resulting signal is amplitude-limited at a low level by a limiter 52, thus separating noise of the flat portion, part of the edge of large amplitude and components of the edge of small amplitude as shown in FIG. 13(a). This signal is applied in proper amount to a subtractor 48 through the amplitude regulator 29. In view of the fact that the reproduction video signal from the frequency characteristics-correcting circuit 46 is applied to the subtractor 48 through the subtractor 47, the signal of FIG. 13(a) is subtracted from the signal of FIG. 7(a), thus reducing the noise of the low frequency of the signal spectrum portion. In other words, the parts 45, 50, 51, 52, 54, 48, 46 and 49 make up a noise cancellation circuit which is known as a conventional noise reduction apparatus. The output of the high-pass filter 50, on the other hand, is applied to the amplitude separation circuit 53 described with reference to FIG. 8, where the noise component of the low frequency portion of the signal is eliminated, so that as shown in FIG. 7(c), the noise and crosstalk included in the edge component and intermediate and high frequency components of the edge portion are picked up. This signal is applied in appropriate amount to the subtractor 47, thus eliminating the noise and crosstalk of the signal edge, i.e. the rising and falling portion. As a result, a signal shown in FIG. 13(b) in which the noise and crosstalk at both the edge portion and flat portion containing low frequency signal components are dampened is produced at the output terminal 49. The output terminal 49 is connected to the mixer 28 in FIG. 3. In this case, the noise reduction circuit 20 is of course removed. According to the method of FIG. 12, it is possible to reduce noise and crosstalk by a simple circuit configuration by dual use of the high-pass filter 50. Further, assuming that the component parts 45, 50, 51, 52, 54, 48, 46 and 47 on the main signal route are eliminated so that the terminal 45 is directly connected to the means 48, the frequency characteristics are reverse to those shown in FIG. 9. Specifically, the amount of de-emphasis is increased with the decrease in magnitude of the signal and therefore, in the circuit of FIG. 12 where the parts 45, 53 and 47 for eliminating the noise of the edge portion are combined with the circuit for eliminating the noises of the flat portion, the intermediate and high frequency components are reduced in amplitude to some degree for both small and large signals. If the intermediate and high frequency range is emphasized to some degree by use of the frequency characteristics-correcting circuit 46, however, the frequency characteristics for all signals from small to large become flat, so that a sharp edge portion is obtained on the one hand and the noise and crosstalk of the edge portion and flat portion are eliminated. As mentioned above, according to the present invention, noise higher than several hundreds of KHz are dampened while at the same time eliminating crosstalk higher than several hundred KHz out of the crosstalk of 0 to 2.4 MHz, i.e., the difference between the maximum FM modulated frequency and the minimum FM modulated frequency (5.3−2.9=2.4 MHz). In view of the fact that the demodulated crosstalk component, due to triangular noise, has a large amplitude in proportion to the difference in FM carrier frequency between tracks, the crosstalk of 0 to several hundred KHz do not cause any problem. If it presents a problem, however, such crosstalk can be reduced visually, i.e., in appearance in the range having a line correlation by use of the FM interleaving technique.

It will thus be understood that according to the present invention crosstalk and noise of the edge portion are eliminated sufficiently thus improving the signal-to-noise ratio thereof. In this way, it is possible to make a recording at high density with short wavelength and narrow tracks.

An application of the present invention is included in a VHS (trademark) 6-hour VTR with a track width of 19 μm and relative speed of 5.8 m/s. By using the method of the present invention, the recording and reproduction with narrower tracks at lower relative speed is made possible on the one hand and a compact apparatus is realized on the other hand. Further, the crosstalk and the signal-to-noise ratio of the flat portion and edge portion are substantially equalized, thus producing a stable picture with a high signal-to noise ratio. Although the foregoing description deals with an NTSC color televison signal, the present invention is of course also applicable to a color television signal of the PAL or SECAM system in which the luminance signal is FM modulated for recording and reproduction.

What is claimed is:

1. A video signal recording and reproducing apparatus including recording means for subjecting at least a luminance signal of a color video signal to frequency modulation and reproducing means for frequency demodulating the modulated signal to provide a reproduction video signal, in which said reproducing means comprises:

separation means responsive to said reproduction video signal for separating a high frequency component signal from said reproduction video signal;

means having a first and a second threshold level for receiving the high frequency component signal from said separation means and for eliminating unnecessary signals superimposed on said reproduction video signal and existing between the first and second threshold levels from the separated high frequency component signal; and means for subtractively combining the separated high frequency component signal at the output of said elimination means, with said reproduction video signal to suppress unnecessary superimposed signals existing at the high frequency component of said reproduction video signal thereby producing a reproduction video signal waveform in which noise at the edge portions thereof is reduced.

2. A video signal recording and reproducing apparatus according to claim 1 wherein said recording means includes emphasis means for emphasizing the high frequency component of a video signal which is to be reproduced by said reproducing means.

3. A video signal recording and reproducing apparatus according to claim 1 wherein said reproducing means includes means for time coinciding said reproduction video signal with said separated high frequency component signal at the output of said eliminating means.

4. A video signal recording and reproducing apparatus according to claim 1 wherein said reproducing means includes phase correction means provided at either one of signal paths of said reproduction video signal and said eliminated high frequency component signal at the output of said eliminating means for coinciding the phase of said reproduction video signal with that of said separated frequency component signal at the output of said eliminating means within a predetermined frequency range.

* * * * *